United States Patent
Scarfone et al.

(10) Patent No.: US 10,803,671 B2
(45) Date of Patent: Oct. 13, 2020

(54) AUTHORING CONTENT IN THREE-DIMENSIONAL ENVIRONMENT

(71) Applicant: Microsoft Technology Licensing, LLC, Redmond, WA (US)

(72) Inventors: Amy Scarfone, Seattle, WA (US); Vidya Srinivasan, Issaquah, WA (US); Colton Brett Marshall, Seattle, WA (US); Aniket Handa, Seattle, WA (US); Nathan Bradley Duke, Kirkland, WA (US); Edward Boyle Averett, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 15/971,261

(22) Filed: May 4, 2018

(65) Prior Publication Data

US 2019/0340831 A1 Nov. 7, 2019

(51) Int. Cl.
*G06T 19/20* (2011.01)
*G06F 16/60* (2019.01)
*G06F 16/50* (2019.01)

(52) U.S. Cl.
CPC .............. *G06T 19/20* (2013.01); *G06F 16/50* (2019.01); *G06F 16/60* (2019.01)

(58) Field of Classification Search
CPC ......... G06T 19/20; G06T 16/60; G06T 16/50; G06F 17/5004; G06F 17/5009
See application file for complete search history.

(56) References Cited

U.S. PATENT DOCUMENTS

| 8,231,465 | B2 | 7/2012 | Yee et al. | |
| 2010/0145665 | A1* | 6/2010 | Mujtaba | G06T 19/20 |
| | | | | 703/1 |
| 2010/0208033 | A1 | 8/2010 | Edge et al. | |
| 2011/0102424 | A1* | 5/2011 | Hibbert | G06T 11/60 |
| | | | | 345/419 |

(Continued)

FOREIGN PATENT DOCUMENTS

WO 2008069474 A1 6/2008

OTHER PUBLICATIONS

"International Search Report and Written Opinion Issued in PCT Application No. PCT/US2019/029243", dated Jul. 25, 2019, 12 Pages.

(Continued)

*Primary Examiner* — Daniel Samwel
(74) *Attorney, Agent, or Firm* — Liang IP, PLLC

(57) ABSTRACT

Computing devices for authoring content in computer-based 3D environments are disclosed herein. In one embodiment, a computing device is configured to provide, on a display, a user interface of a 3D authoring application having a 3D working area with a predefined shape and size. The computing device is also configured to, in response to receiving a user input selecting a 3D component, retrieve one or more files of the 3D component containing data that is preprocessed according to the predefined shape and size of the 3D working area. Based on the retrieved data of the 3D component, the computing device can produce (i) a graphical representation of one or more objects or (ii) a sound in the 3D working area without modifying, outside of the 3D authoring application, underlying data of the one or more objects or sound.

20 Claims, 9 Drawing Sheets

(56) References Cited

U.S. PATENT DOCUMENTS

| | | | |
|---|---|---|---|
| 2012/0229508 A1 | 9/2012 | Wigdor et al. | |
| 2012/0233555 A1 | 9/2012 | Psistakis et al. | |
| 2013/0212453 A1 | 8/2013 | Gudai et al. | |
| 2015/0332511 A1* | 11/2015 | Jovanovic | G06T 15/20 345/427 |
| 2016/0100034 A1 | 4/2016 | Miller | |
| 2016/0371888 A1 | 12/2016 | Wright et al. | |
| 2017/0103575 A1* | 4/2017 | Yamamoto | G06T 3/40 |
| 2017/0132842 A1 | 5/2017 | Morrison | |
| 2017/0161404 A1* | 6/2017 | High | G06F 17/5004 |
| 2017/0256096 A1* | 9/2017 | Faaborg | G06T 19/20 |
| 2017/0354883 A1* | 12/2017 | Benedetto | A63F 13/533 |
| 2018/0018828 A1* | 1/2018 | LaMontagne | G06T 19/20 |
| 2019/0042667 A1* | 2/2019 | Amadon | G06N 20/00 |
| 2019/0066389 A1* | 2/2019 | Jacobson | G06T 19/20 |

OTHER PUBLICATIONS

Conrad, Jim, "Building Mixed Reality spaces for the web", Retrieved From https://blog.mozvr.com/building-mixed-reality-spaces-for-the-web/, Mar. 15, 2018, 7 Pages.

Stott, Lee, "Mixed Reality Immersive—A Beginners guide to building for MR", Retrieved From https://blogs.msdn.microsoft.com/uk_faculty_connection/2017/10/09/mixed-reality-immersive-a-beginners-guide-to-building-for-mr/, Oct. 9, 2017, 35 Pages.

Zeller, et al., "Navigating the Windows Mixed Reality home", Retrieved From https://docs.microsoft.com/en-us/windows/mixed-reality/navigating-the-windows-mixed-reality-home, Mar. 21, 2018, 7 Pages.

\* cited by examiner

AUTHORING CONTENT IN THREE-DIMENSIONAL ENVIRONMENT

BACKGROUND

In computing, a three-dimensional (3D) environment typically refers to a computer-based simulated 3D platform in which 3D representations of images, videos, sounds, or other digital content can be presented to viewers. 3D environments can provide a more immersive viewing experience than two-dimensional (2D) environments. However, authoring content in 3D environments remains challenging because of complexities in accurate representation and interaction control of objects in 3D environments. Due to such complexities, today, only a small group of authors possess necessary technical skills to create suitable content in 3D environments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Authoring content in 3D environments can be challenging because of a whole range of authoring activities that are absent from authoring in 2D environments. Typically, multiple applications are utilized in order to create a content item in a 3D environment. For example, a process for creating a background (e.g., blue sky with clouds) of a 3D environment involves first creating a composite image of a blue sky with images of cloud(s) in an image editing application, such as Photoshop®. The composite image is then exported using a 2D to 3D conversion application into multiple files of different views of a 3D image. The exported files can then be imported into a 3D authoring application such as Unity® for combining with other content items.

During each of the foregoing stages, an author is confronted with many settings and parameters. For example, during image editing, the author may choose a resolution for the composite image, a color gradient from ground to sky, edge transition, etc. Any one of such settings may impact resulting content item in the 3D environment. As such, to obtain a suitable background in the 3D environment, the author may need to return to the image editing application to edit the composite image, and repeat the exporting and importing operations through trial and error until a satisfactory result is obtained. As such, creating a suitable background in a 3D environment can be labor intensive and require substantial technical knowledge.

In another example, creating a structure such as a building or room may also be labor intensive and technically challenging. A typical process for creating a building involves generating a 3D model of a building using a 3D modeling application such as SketchUP®. The 3D model can include structural features such as roofs, walls, windows, etc., as well as color (red, beige, etc.) and/or texture (e.g., brick, wood, tile, etc.) of the structure features. The 3D model can then be exported to a 3D authoring application such as Unity® for further processing.

Similar to creating the background above, adjustment of many settings during both 3D model generation and exportation may involve substantial technical knowledge in order to obtain a suitable structure in a 3D environment. For instance, if the 3D model is exported with an one-sided face, the building in the 3D environment may appear distorted or illogical. Also, the author must correctly select a scale factor when importing into the 3D authoring application, or the building can appear out of scale. Even when the author correctly selects all settings, to make a small change to the building, for example, changing from a brick exterior to a wooden exterior, requires repetitions of the entire process.

In a further example, inserting a sound into a 3D environment can be quite technically involved. Typically, a sound (e.g., inset chirping) needs to be attached to an object (e.g., a tree) in a 3D environment. The sound also needs to fade with respect to a viewer's position in a 3D environment. Configuring these features can require substantial technical knowledge. For instance, when configuring fade away of the sound, an author may need to adjust one or more parameters of an exponential decay function such that the sound would not drop off too fast or too slow as a position of a viewer changes.

As such, authoring single content items such as a background, a structure, or a sound in a 3D environment can be technically challenging and labor intensive. When an author combines multiple content items, creation of suitable content in a 3D environment can be even more difficult and time consuming. For example, when an author combines the foregoing example building into the background, one change in the background (e.g., color) may cause the author to repeat the entire process for generating the initial background. The change in the background may also necessitate changes in other content items in the 3D environment corresponding to additional repetitions of processes. As such, authoring content items in a 3D environment can be labor intensive and technically challenging.

Several embodiments of the disclosed technology can address at least some aspects of the foregoing difficulties by providing a 3D authoring application configured to allow various pre-processed 3D components to be interchangeably applied in a 3D environment by simply selecting and applying the 3D components. In one implementation, the 3D authoring application can be configured to provide a 3D working area of a predefined shape and size (e.g., a dome over a platter with a radius of 20 meters, the platter having a roof, or the platter on top of a mountain, building, etc.). The various 3D components can be categorized into structures (e.g., building, room, etc.), themes (e.g., color, texture, lighting profile, style etc.), background (e.g., images of solid colors, photos, illustrations, etc.), and sounds (e.g., wave crashing, bird singing, etc.). In other implementations, the predefined 3D editing platform can encompass other suitable 3D working areas (e.g., a partial sphere with an opening on top) of other suitable sizes (e.g., a radius of 18, 22, or 30 meters). The 3D components can also be further categorized or aggregated for suitable applications.

It has been recognized that by predefining a 3D working area of a preset shape and size, various features, such as structures, themes, backgrounds, and sounds can be pre-processed as 3D components according to the preset shape and size of the 3D working area. As such, an author can easily create suitable content in the 3D working area by simply substituting one 3D component with another without repetitive trial and error operations using multiple applications. For example, when an author modifies a background of the content in the 3D environment from, for instance, a sky to a mountain, the author can affect such a modification without reverting back to the image editing application to generate underlying data for the new background. Instead, the author can simply select a pre-processed 3D component of the new background and apply the selected 3D component to the 3D environment. The resulting modified content would appear suitably in the 3D environment without requiring the author to manipulate various settings or parameters associated with generating and/or importing the underlying data.

Several embodiments of the disclosed technology can thus greatly simplify content authoring in 3D environments. Unlike other 3D content authoring techniques, embodiments of the disclosed technology do not involve juggling multiple applications in order to create or modify one feature of content in a 3D environment. Instead, various features in a 3D environment can be provided as pre-processed 3D components for selection and application. As such, authors who do not have substantial technical knowledge in manipulating 3D content can be enabled to create, modify, or otherwise manipulate content in 3D environments. In addition, any modifications to content in 3D environments can also be easily performed without repetitive trial and error processes.

DETAILED DESCRIPTION

Figure 1:
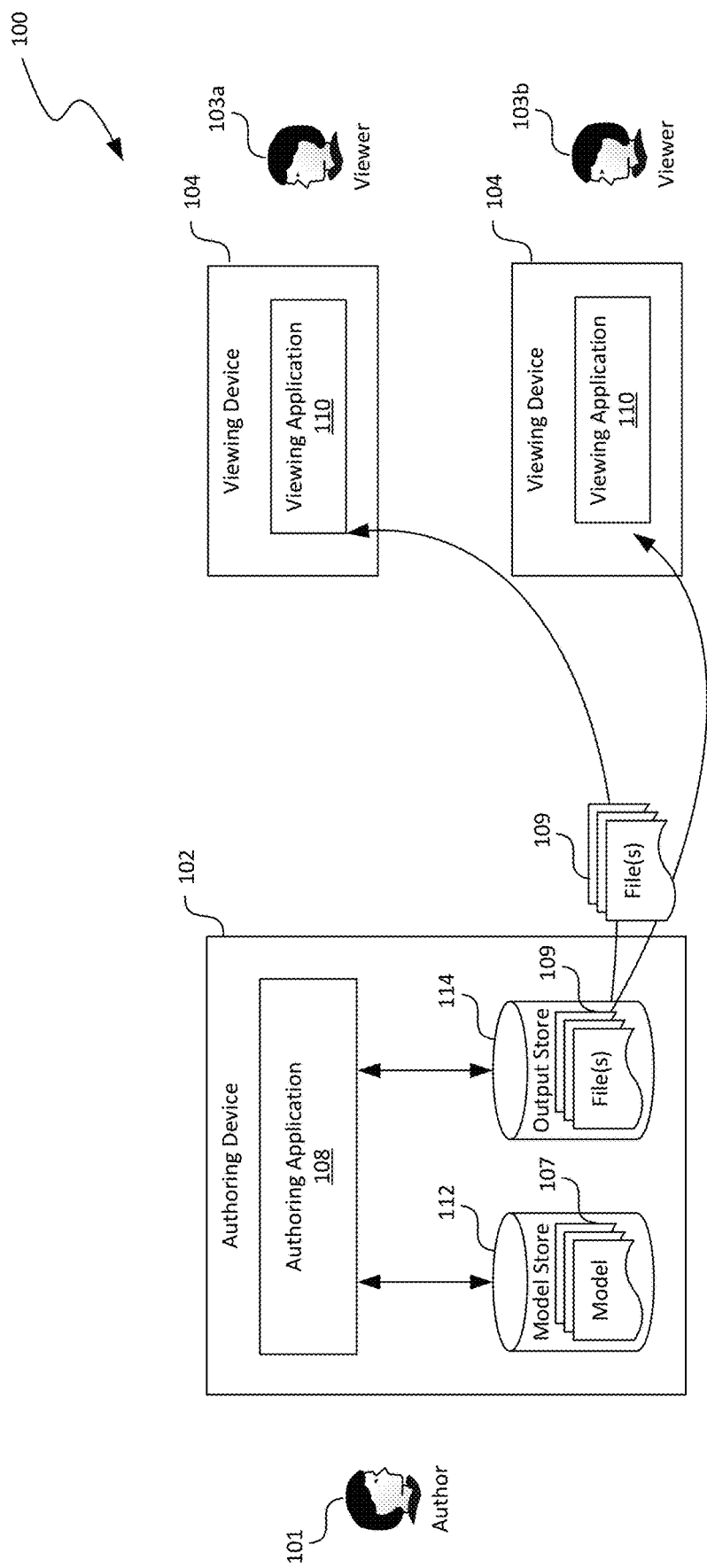
FIG. 1 is a schematic diagram illustrating a computing framework implementing an authoring application for authoring of content in a 3D environment in accordance with embodiments of the disclosed technology.

Certain embodiments of systems, devices, components, modules, routines, data structures, and processes for authoring content in a 3D environment are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-7.

As used herein, a "three-dimensional environment" or "3D environment" generally refers to a computer-based simulated 3D platform in which 2D or 3D representations of images, videos, sounds, or other digital content items can be presented to a viewer. A 3D environment can be a virtual space, such as a virtual reality (VR) world, or can be a real world space in which content can be displayed or layered on top of the real world, such as via augmented reality (AR) or other VR techniques.

Also used herein, the term "model" generally refers to data representing a two-dimensional (2D) or 3D component that can be rendered and/or applied in a 3D environment. Example models can include data representing a virtual room, a virtual scene, or any other subpart of a virtual world. In accordance with embodiments of the disclosed technology, 3D components can be categorized into certain groups. For example, 3D components can be categorized into structures (e.g., building, room, etc.), themes (e.g., color, texture, lighting profile, style etc.), background (e.g., images of solid colors, photos, illustrations, etc.), and sounds (e.g., wave crashing, bird singing, etc.). Certain 3D components, such as structures or sounds, can be inserted into a 3D working area. Other components, such as colors, textures, or lighting profiles can be applied in the 3D working area to effect changes to existing or additional objects in the 3D working area.

As described in more detail later, the various 3D components can be pre-processed based on a predefined shape and size of the 3D working area. Thus, each model can contain data (e.g., a multiple files) that can be imported, inserted, applied in the 3D working area without modifying underlying data of the objects. Further used herein, the term "object" or "virtual object" generally refers to a visual representation of a 2D or 3D content item rendered in a 3D environment. Example objects can include 3D images, video recordings, etc.

Authoring content in 3D environments can be challenging because of a whole range of authoring activities that are absent from authoring in 2D environments. Typically, multiple applications are utilized in order to create a content item in a 3D environment. For example, a process for creating a background (e.g., blue sky with clouds) of a 3D environment involves first creating a composite image of a blue sky with images of cloud(s) in an image editing application, such as Photoshop®. The composite image is then exported using a 2D to 3D conversion application into multiple files of different views of a 3D image. The exported files can then be imported into a 3D authoring application such as Unity® for combining with other content items.

During each of the foregoing stages, an author is confronted with many settings and parameters. For example, during image editing, the author may choose a resolution for the composite image, a color gradient from ground to sky, edge transition, etc. Any one of such settings may impact resulting content item in the 3D environment. As such, to obtain a suitable background in the 3D environment, the author may need to return to the image editing application to edit the composite image, and repeat the exporting and importing operations through trial and error until a satisfactory result is obtained. As such, creating a suitable background in a 3D environment can be labor intensive and require substantial technical knowledge.

Several embodiments of the disclosed technology can address at least some aspects of the foregoing difficulties by providing a 3D authoring application configured to allow various pre-processed 3D components to be interchangeably applied in a 3D environment by simply selecting and applying the 3D components. In one implementation, the 3D authoring application can be configured to provide a 3D working area of a predefined shape and size (e.g., a dome over a platter with a radius of 20 meters, the platter having a roof, or the platter on top of a mountain, building, etc.). The various 3D components can be categorized into structures (e.g., building, room, etc.), themes (e.g., color, texture, lighting profile, style etc.), background (e.g., images of solid colors, photos, illustrations, etc.), and sounds (e.g., wave crashing, bird singing, etc.) and pre-processed according to the predefined shape and size of the 3D working area. As such, an author can easily create suitable content in the 3D working area by simply substituting one 3D component with another without repetitive trial and error operations using multiple applications. Several embodiments of the disclosed technology can thus greatly simplify content authoring in 3D environments, as described in more detail below with reference to FIGS. 1-7.

FIG. 1 is a schematic diagram illustrating a computing framework 100 for content authoring and generation in a 3D environment in accordance with embodiments of the disclosed technology. As shown in FIG. 1, the computing framework 100 can include an authoring devices 102 corresponding to an author 101 and one or more viewing devices 104 corresponding to viewers 103 (shown as first and second viewers 103a and 103b). The authoring device 102 and the viewing devices 104 can individually include a mobile computing device, a laptop, a tablet computer, a desktop computer, or other suitable types of computing device. Even though only one authoring device 101 and two viewing devices 103 are shown in FIG. 1 for illustration purposes, in other embodiments, the computing framework 100 can facilitate content authoring for additional authors 101 and/or viewers 103 with corresponding authoring and viewing devices (not shown). Example configurations of the authoring device 102 and the viewing devices 104 are described below in more detail with reference to FIG. 6.

As shown in FIG. 1, the authoring device 102 can include an authoring application 108, a model store 112 containing data records of models 107 corresponding to 3D components, and an output store 114 containing data records of 3D environment files 109. The authoring application 108 can be configured to provide the author 101 a user interface 130 (shown in FIG. 2A) representing a 3D environment having a 3D working area 133 (shown in FIG. 2A) to facilitate authoring content in a 3D environment. In certain embodiments, the authoring application 108 can be a web-based application accessible by the author 101 via a web browser. In other examples, the authoring application 108 can be an executable application, which can be retrieved and executed by a processor of the authoring device 102.

In certain embodiments, different types of content can be embedded or included in the 3D environment. Example content types can include 3D objects (e.g., 3D models, figures, shapes, etc.) or 2D objects (e.g., files, images, presentations, documents, web sites, videos, remote resources, etc.), etc. In other embodiments, a 3D environment can be a virtual space, such as a virtual reality (VR) world, or can be a real world space in which content can be displayed or layered on top of the real world, such as via augmented reality (AR) or other VR techniques. The 3D environment with the inserted models can then be stored as an environment data file later used to reproduce a 3D environment having 3D renderings of the inserted models.

In one embodiment, the authoring application 108 can be configured to display 2D or 3D representations of one or more models 107 of 3D components in a gallery, list, or other suitable form. The author 101 can then select and insert a representation into the provided 3D working area 133 to generate and/or modify one or more objects in the 3D working area 133. As described in more detail below with reference to FIGS. 2A-2D, the authoring application 108 can contain additional modules and routines configured to automatically position and arrange the inserted objects based on the pre-processed 3D components such that the author 101 can place content items into the 3D environment without labor intensive trial and error experimentations.

The model store 112 can store one or more models 107 representing corresponding 3D components that can be used to author a 3D environment. In one example, models 107 may be associated with one or more topics. When the author 101 selects a topic, the authoring application 108 can provide one or more models 107 associated with the selected topic. In some examples, a set of models 107 can be designed such that stitching a model 107 together with another model 107 from the same set can form a seemingly continuous model 107. In other examples, aspects of a model 107 stored in the model store 112 can be generated dynamically or programmatically. In certain embodiments, the author 101 can create the models 107 using the authoring application 108. In other embodiments, the models 107 can be retrieved from, for example, third party vendors of 2D or 3D content items, or from other suitable sources.

In certain embodiments, a model 107 may indicate that certain aspects may be substituted depending on another model 107 with which the original model 107 can be stitched. As an example, a first model 107 can indicate that a wall or archway may be replaced with a door. As such, an entry point of a second model may be stitched to the first model at the door. In other embodiments, other suitable replacement or model generation techniques may be used to generate the various models 107.

The authoring application 108 can also be configured to output an authored 3D environment as an environment data file 109 containing 3D environment data to, for example, the output store 114. In one implementation, the environment data file 109 can comprise information associated with selected models 107 (e.g., a model identifier, a model name, a model type, etc.), positioning information (e.g., coordinates, anchor point identifiers, etc.), content information (e.g., which content should be displayed for one or more anchor points, the content to be displayed, a reference to content, etc.), custom resources (e.g., custom textures, sounds, etc.), among other information. As shown in FIG. 1, the output store 114 can be configured to store one or more environment data files 109. As used herein, an "environment data file" can include a file on a file system, an entry in a database, or can be stored using any of a variety of other data storage techniques.

A 3D environment authored according to aspects disclosed herein can then be consumed and experienced across a wide spectrum of computing devices, ranging from low-end devices (e.g., GOOGLE CARDBOARD) to high-end devices (e.g., MICROSOFT HOLOLENS, OCULOUS RIFT, HTC VIVE, etc.). As shown in FIG. 1, the viewing devices 104 can each contain a viewing application 110 configured to generate, view, explore, and/or interact with a 3D environment based on an environment data file 109. In one example, viewing application 110 may be a web-based application accessible using a web browser. In other examples, the viewing application 110 can be an executable application for the viewing devices 104. In operation, the viewing application 110 can be configured to evaluate an environment data file 109 to identify one or more models 107 of a 3D environment. If an environment data file 109 references a plurality of models 107, the models 107 may be stitched together when rendering the 3D environment. The viewing application 110 can populate the rendered 3D environment with content based on the content specified by the environment data file 109. In one example, the viewing application 110 can use any of a variety of 3D rendering engines and can handle device- and/or engine-specific implementation details when rendering the 3D environment.

In certain embodiments, the viewing application 110 can be configured to retrieve an environment data file 109 from the output store 114, which, in conjunction with one or more models 107 from the model store 112, may be used to generate a 3D environment. In other embodiments in which the viewing application 110 is a locally-executed application, a model store 112 may be stored locally and/or remotely to the viewing device 104 executing the viewing application 110, and at least a part of an environment data file 109 may be retrieved from the output store 114. In further embodiments, the environment data file 109 may be streamed or retrieved in chunks from the output store 114 to the viewing devices 104.

Figure 2A:
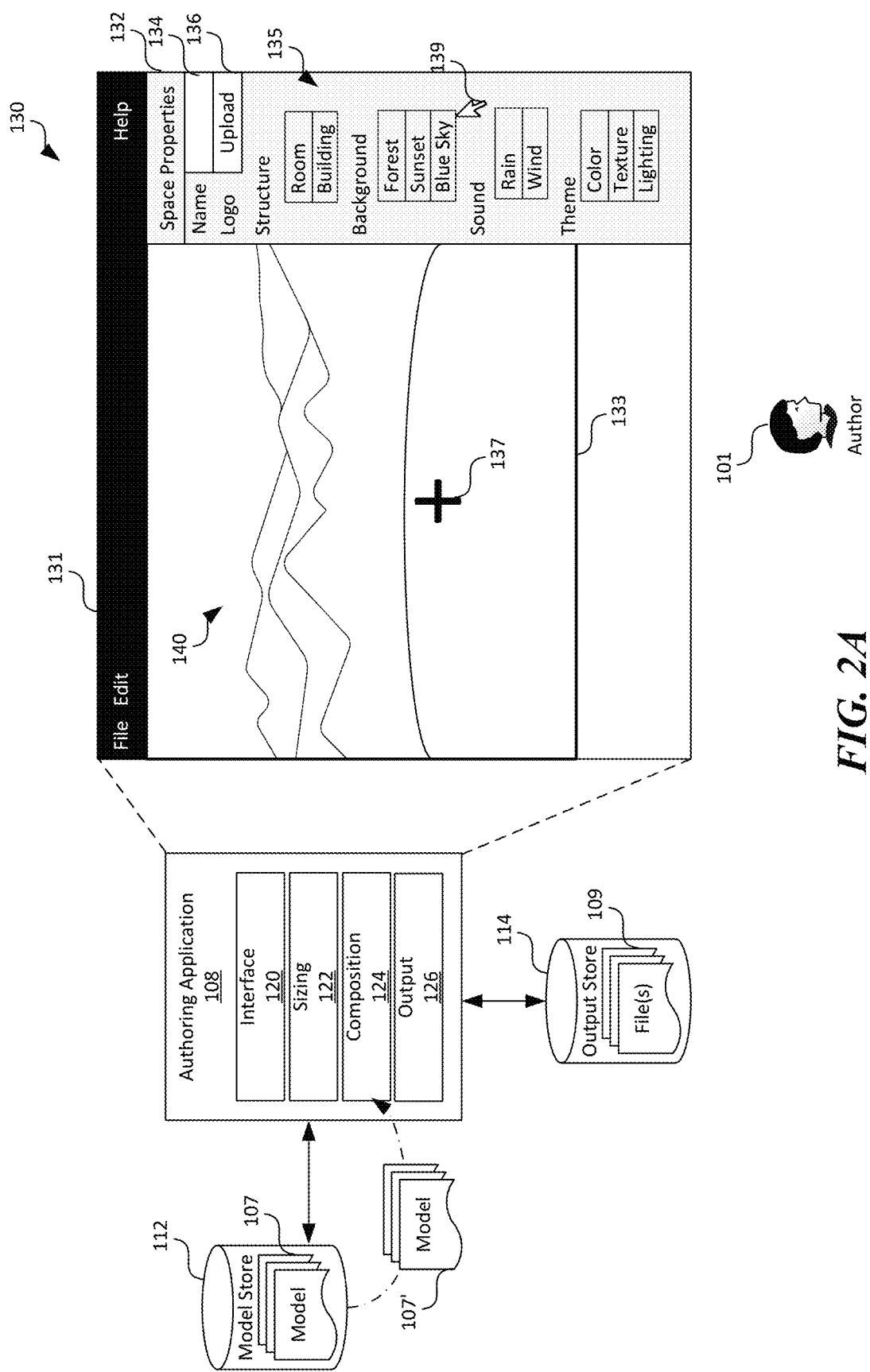
FIGS. 2A-2D are partially schematic diagrams illustrating certain hardware/software components of the computing framework of FIG. 1 in accordance with embodiments of the disclosed technology.

FIGS. 2A-2D are partially schematic diagrams illustrating certain hardware/software components of the computing framework 100 of FIG. 1 in accordance with embodiments of the disclosed technology. As shown in FIG. 2A, the authoring application 108 can include an interface component 120, a sizing component 122, a composition component 124, and an output component 126 operatively coupled to one another. Even though particular components are shown in FIG. 2A for illustration purposes, in other embodiments, the authoring application 108 can also include an input component or other suitable types of component.

In FIG. 2A and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the interface component 120 of the authoring application 108 can be configured to provide a user interface 130 for facilitating the author 101 to create and/or modify content in a 3D environment. In the illustrated example, the user interface 130 can include a menu bar 131 containing one or more menu groups such as "File," "Edit," and "Help." Each of the foregoing menu groups can be expanded for additional menu items such as "New," "Open," "Save," etc. In one example, the "Edit" menu can be expanded to provide an option for undo a change in the 3D environment. In other examples, the menu bar 131 can include other suitable types of menu items.

As shown in FIG. 2A, the user interface 130 can also include a 3D working area 133 and a space property sidebar 132 containing various input fields and multiple 3D components 135 corresponding to the models 107 in the model store 112. The 3D working area 133 can be initially loaded with a template 140 of a 3D environment or with a previously saved 3D environment corresponding to an environment data file 109 in the output store 114. In the illustrated example in FIG. 2A, the 3D working area 133 is loaded with a template 140 of a 3D environment having a mountain, a sky, and an open ground in front of the mountain. In other examples, the template 140 can include forest, buildings, or other suitable types of 3D environment.

As shown in FIG. 2A, the example space property sidebar 132 can include an input field 134 for entering a name for the 3D working area 133 and a button 136 for allowing the author to import a logo image into the 3D working area 133. The space property sidebar 132 can also list the various 3D components 135 in corresponding categories. For instance, the 3D components 135 can be listed as structures (e.g., "Building" and "Trees"), backgrounds (e.g., "Forest," "Sunset," and "Blue sky"), sounds (e.g., "Rain" and "Wind"), and themes (e.g., "Color," "Texture," and "Lighting"). In other examples, the foregoing 3D components 135 may be categorized in other suitable fashions. As described in more detail below, each of the 3D components 135 can correspond to a model 107 that is pre-processed according to a pre-defined shape and size of the 3D working area 133, examples of which are described later with reference to FIGS. 3A-3C.

The interface component 120 can also be configured to provide one or more anchor point 137 in the template 140 for placement of for example, a structure or other suitable types of object. In FIG. 2A, the anchor point 137 is represented as a cross. In other embodiments, the anchor point 137 can also be represented as an arrow, star, or other suitable representation. In certain embodiments, the anchor point 137 can be designated by the author 101 by, for example, placing the anchor point 137 at an author selected location. In other embodiments, the anchor point 137 can be automatically determined by the interface component 120 at a location by the composition component 124 in the 3D working area 133 as one of multiple default anchor points 137. In further embodiments, the interface component 120 can allow the author 101 to place the anchor point 137 at locations within certain limited areas in the 3D environment.

As shown in FIG. 2A, the interface component 120 can also be configured to detect that the author 101 selects a 3D component 135 (e.g., a background of "Blue Sky") from the space property sidebar 132, as indicated by the cursor 139. In certain embodiments, the interface component 120 can then pass the detected user input to the sizing component 122 for determining whether the selected object 135 requires resizing. In one embodiment, the sizing component 122 can be configured to determine whether the selected object requires resizing by fitting the selected 3D component 135 into a container of a preset size. An example of a suitable container can include a cube having a one cubic meter volume. In other examples, the sizing component 122 can be configured to fit the selected 3D component 135 into a sphere, a cylinder, or other suitable shapes of volume with suitable sizes.

In response to determining that the 3D component 135 exceeds the container in at least one dimension, the sizing component 122 can resize the 3D component 135 so the 3D component 135 just fits inside the container. On the other hand, when the 3D component 135 is too small, for example, not having at least one dimension within 90%, 95%, or other suitable threshold of a corresponding dimension of the container, the sizing component 122 can also enlarge the 3D component 135 to be sized just to fit into the container. Such resizing can thus render all inserted 3D component 135 to be approximately the same size for optimal viewing in the 3D environment. Upon completion of the foregoing sizing operations, the sizing component 122 can pass control to the composition component 124 for applying to the 3D working area 133. In other embodiments, the foregoing resizing operations may be omitted, and the interface component 120 can pass the user input directly to the composition component 124 for further processing.

Figure 2B:
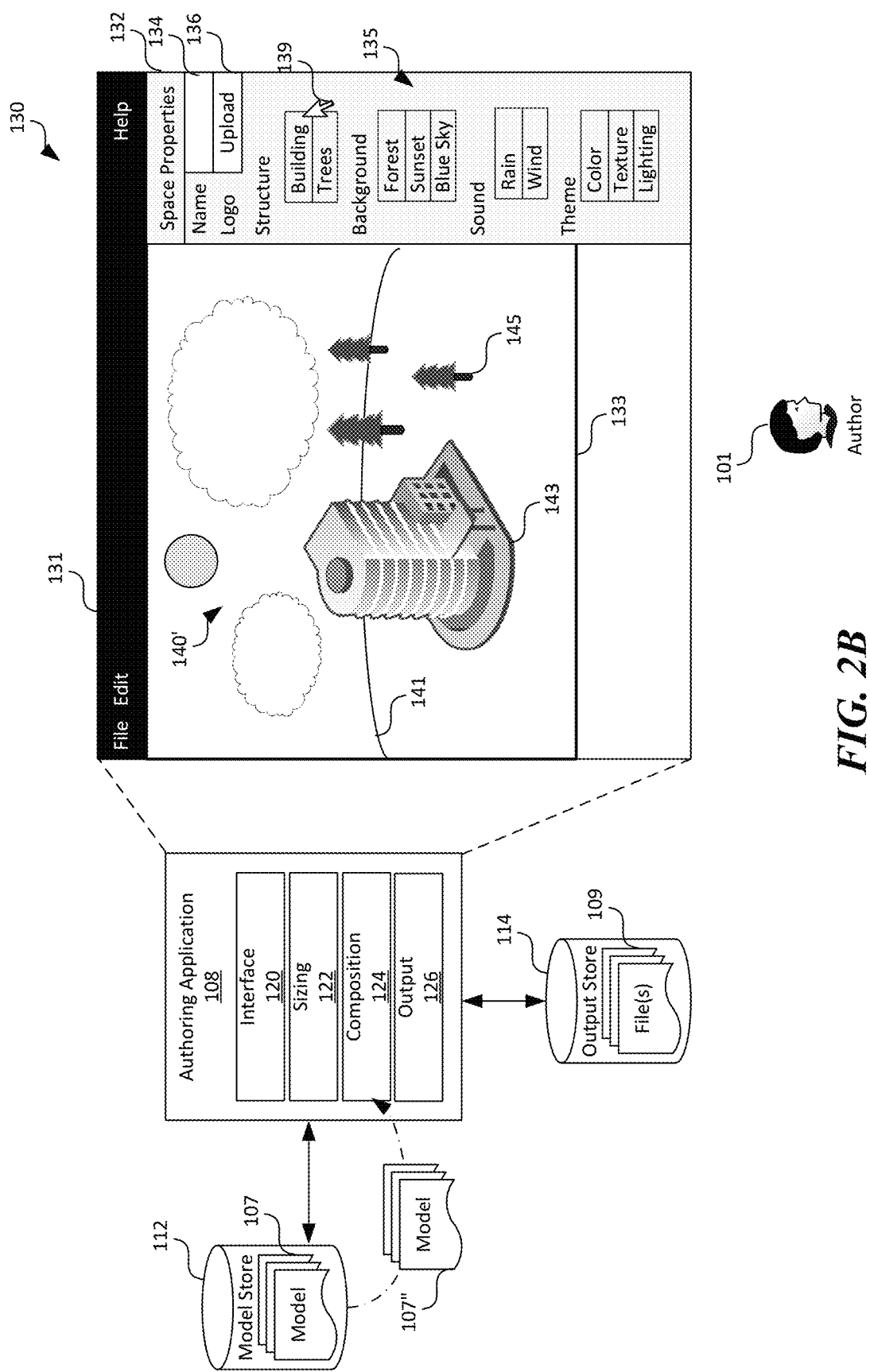

In response to receiving the user input selecting the 3D component 135 for applying to the 3D working area 133, the composition component 124 can be configured to retrieve a corresponding model 107 from the model store 112. For instance, in the illustrated example, the composition component 124 retrieves a model 107' corresponding to a background of "Blue Sky." The composition component 124 can then substitute the existing background having the mountain 140 with another background having the "Blue Sky," as shown in FIG. 2B. As shown in FIG. 2B, the example background "Blue Sky" 140' is illustrated as a background having a horizon 141 with clouds and the Sun in the sky.

In accordance with embodiments of the disclosed technology, the retrieved model 107' can be pre-processed based on a predefined shape and size (e.g., a dome over a platter with a radius of 20 meters, the platter having a roof, or the platter on top of a mountain, building, etc.) of the 3D working area 133 into a data package suitable for importing into the 3D working area 133 without generating and/or modifying underlying data of the background. For instance, an editor (not shown) or other suitable entities with sufficient technical knowledge can initially create a composite image of the blue sky with images of cloud(s) in an image editing application, such as Photoshop®. The editor can then export the composite image using a 2D to 3D conversion application into multiple files of different views of a 3D image. The exported files can then be imported as a data package into the 3D working area 133.

During each of the foregoing stages, the editor is confronted with many settings and parameters. For example, during image editing, the editor may choose a resolution for the composite image, a color gradient from ground to sky, edge transition, etc. Any one of such settings may impact resulting content item (e.g., the background) in the 3D environment. As such, to obtain a suitable background of "Blue Sky" in the 3D environment, the editor may need to return to the image editing application to edit the composite image, and repeat the exporting and importing operations through trial and error until a satisfactory result is obtained. Subsequently, the files or a directory of files corresponding to the satisfactory background can be stored in the model store 112 as a model 107.

As such, by pre-processing the models 107 corresponding to the 3D components 135, the author 101 can efficiently create and/or modify objects in the 3D working area 133 even without any technical knowledge of how to generate or modify the various 3D components 135. For instance, as shown in FIG. 2B, the author 101 can select the 3D components "Building" and "Trees" to add one or more buildings 143 and trees 145 into the 3D working area 133 without first creating such structures in a 3D modeling application and importing corresponding 3D model files into the 3D working area 133.

Figure 2C:
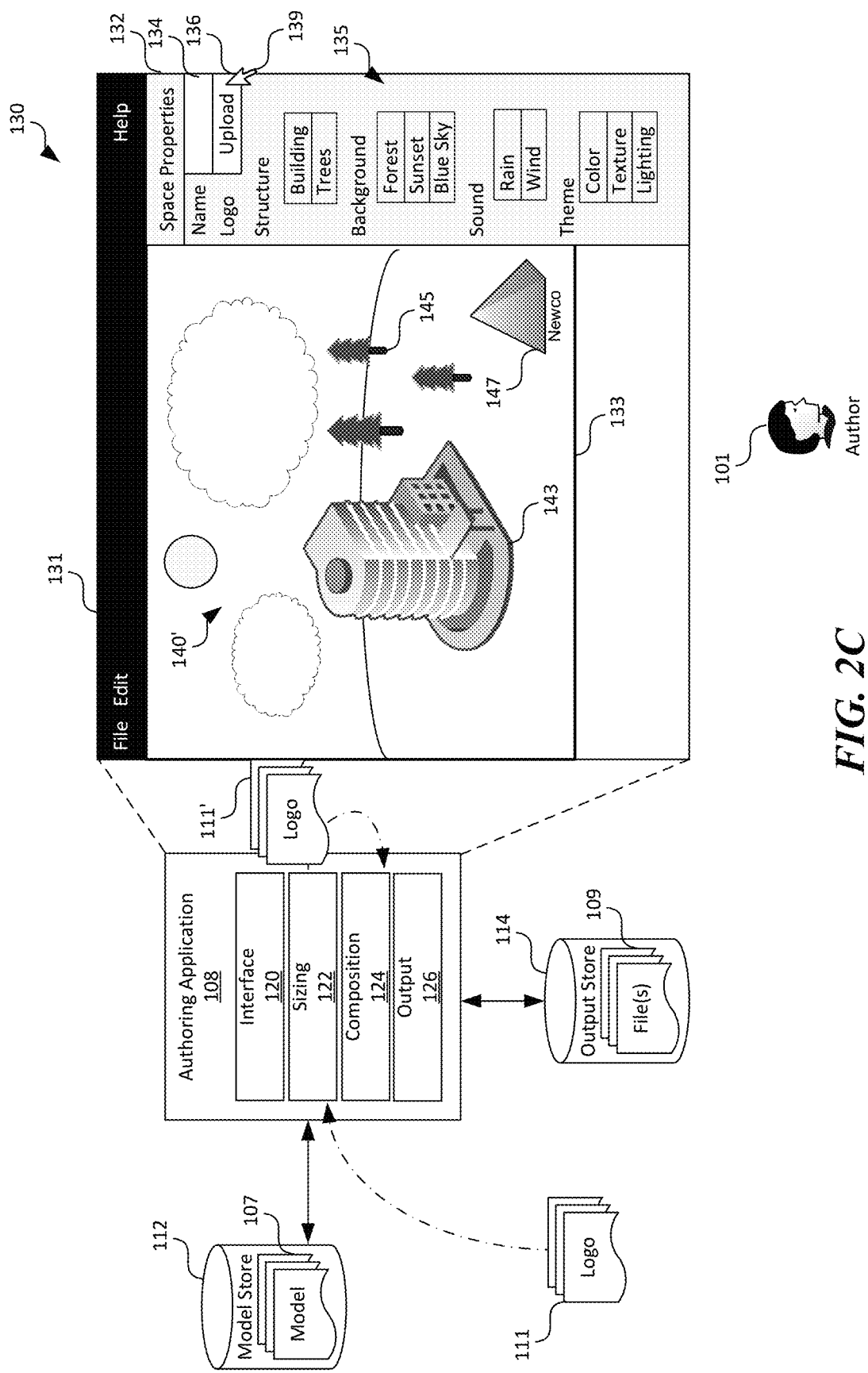

As shown in FIG. 2C, the authoring application 108 can also be configured to allow the author 101 to import a custom logo or other suitable 2D or 3D content items into the 3D working area 133. For example, the author 101 can click on the upload button 136 to choose a logo file 111. In response, the sizing component 122 can be configured to resize a corresponding object of the logo file 111, as described above with reference to FIG. 2A. Subsequently, the sizing component 122 can provide the resized logo file 111' to the composition component 124 for importing into and rendering as the logo 147 in the 3D working area 133. In the illustrated example, the logo 147 is shown as a pyramid with a caption of "Newco." In other examples, the logo 147 can include a 2D image, another 3D image, or other suitable representations.

Figure 2D:
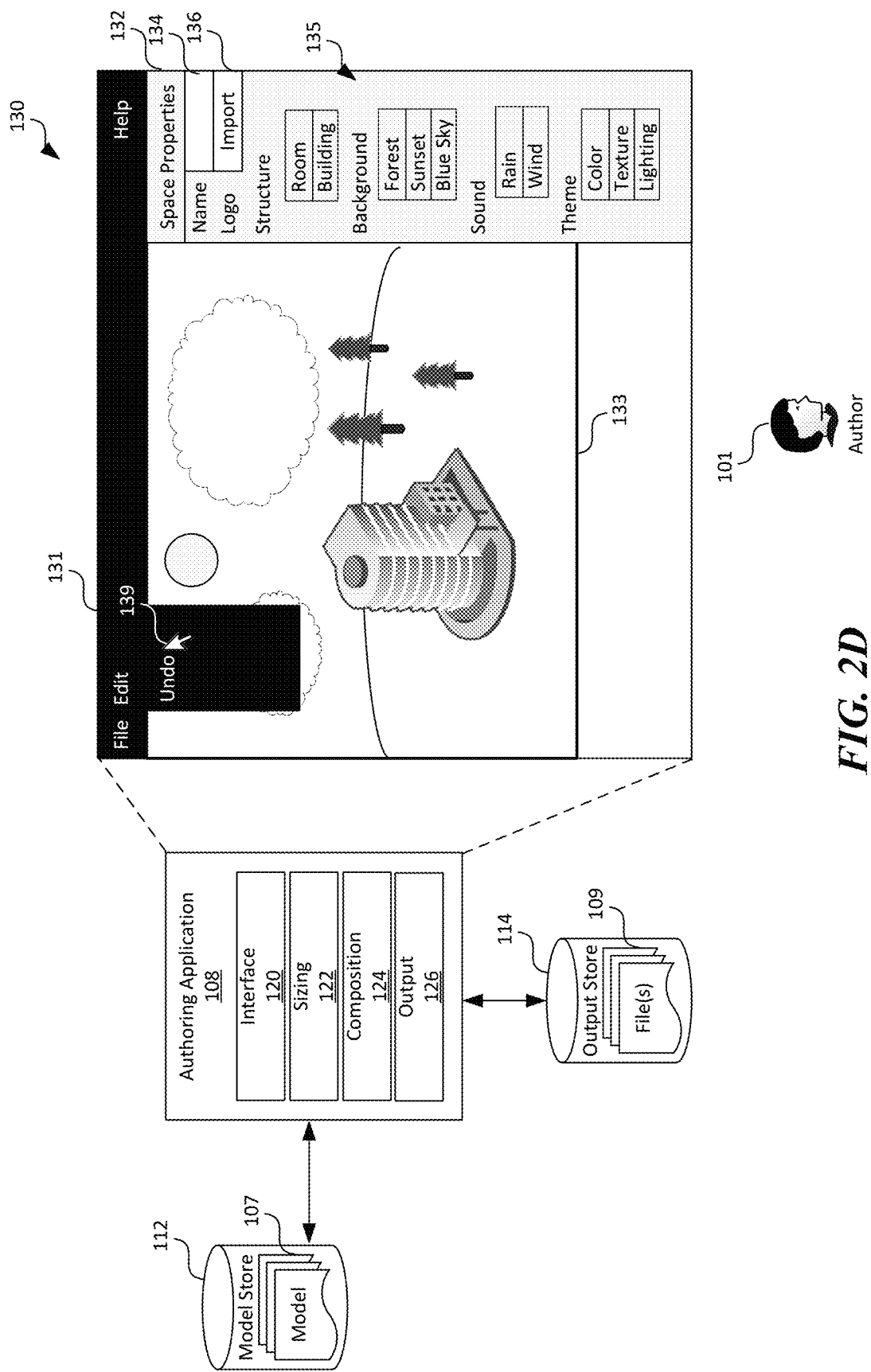

Several embodiments of the disclosed technology can also allow efficient undo operations when authoring content in the 3D working area 133. For example, as shown in FIG. 2D, when the author 101 clicks on the menu "Edit," a dropdown menu can be displayed providing a selection for undo a last edit in the 3D working area 133. When a user input selecting the "Undo" option, the composition component 124 can simply remove a model 107 last inserted or applied in the 3D working area 133. For instance, in the illustrated example, the inserted logo 147 has been removed from the 3D working area.

When the author 101 finishes authoring conent in the 3D working area 133, the output component 126 can be configured to generate an environment data file 109 to be stored in the output store 126. The environment data file 210 can contain data representing the various models 107 of the 3D components 135 in the 3D working area 135 as well as an identity, position, size, relative location, or other suitable information of the 3D components.

As such, unlike other techniques for authoring content in 3D environments, several embodiments of the disclosed technology can provide efficient and straightforward content authoring in 3D environments by providing pre-processed 3D components to be interchangeably applied in a 3D environment. Thus, the author 101 would not need to juggle multiple applications in order to create or modify even one feature in the 3D working area 133. Instead, various features in the 3D working are can be selected from a menu and simply applied in the 3D working area. As such, the author 101 who do not have substantial technical knowledge in manipulating 3D content can still create, modify, or otherwise manipulate content in 3D environments. In addition, any modifications to content in the 3D working area 133 can also be easily performed without repetitive trial and error processes by simply substituting one from another 3D component.

Figure 3A:
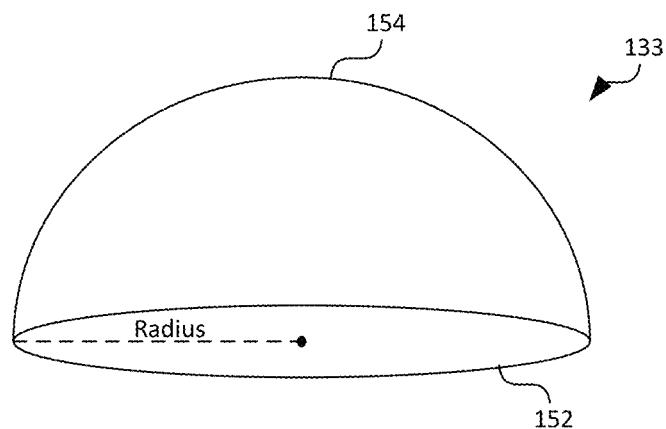
FIGS. 3A-3C are schematic diagrams illustrating example predefined 3D working areas in accordance with embodiments of the disclosed technology.
Figure 3B:
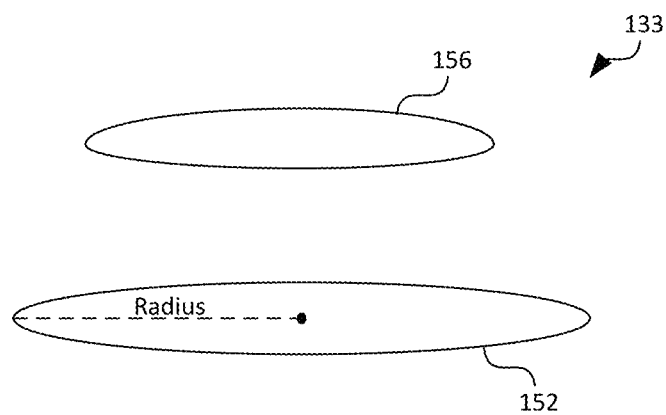
Figure 3C:
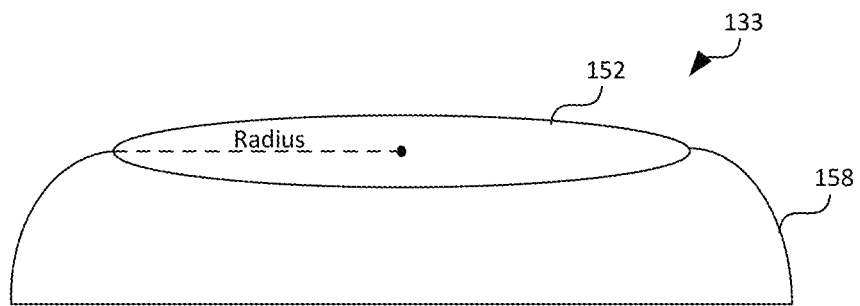

FIGS. 3A-3C are schematic diagrams illustrating example predefined 3D working areas 133 in accordance with embodiments of the disclosed technology. As shown in FIG. 3A, the 3D working area 133 can include a platter 152 having a radius of about 15 meters to about 25 meters and a dome 154 over the platter 152. As shown in FIG. 3B, the 3D working area 133 can include the platter 152 and a roof, ceiling, or other suitable types of cover 156 over the platter 152. As shown in FIG. 3C, the 3D working area 133 can include the platter 152 placed on top of a mountain, building, or other suitable locales 158.

Figure 4:
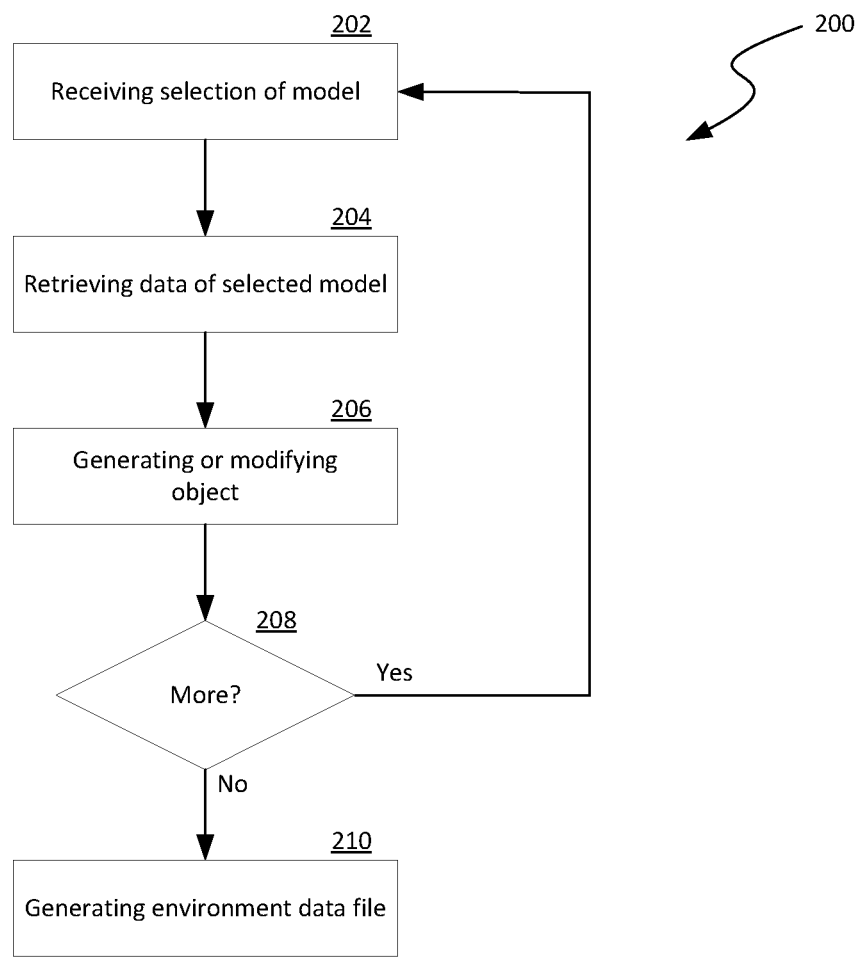
FIGS. 4-6 are flowcharts illustrating certain processes of content authoring in a 3D environment in accordance with embodiments of the disclosed technology.
Figure 5:
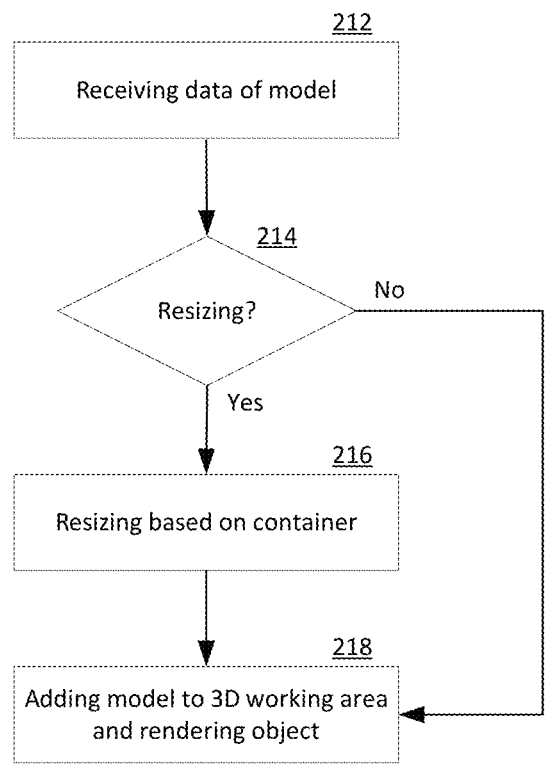
Figure 6:
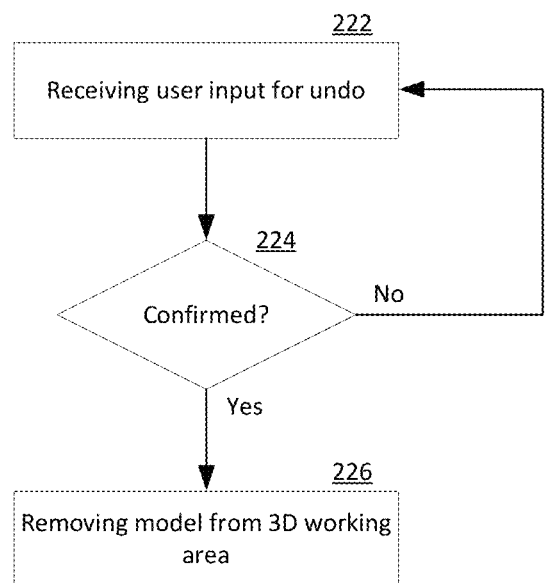

FIGS. 4-6 are flowcharts illustrating certain processes of content authoring in a 3D environment in accordance with embodiments of the disclosed technology. Even though the processes are described below with reference to the computing framework 100 of FIG. 1 and the authoring application 108 of FIGS. 2A-2D, in other embodiments, the processes can also be implemented in other suitable computing frameworks or systems with additional and/or different components.

As shown in FIG. 4, a process 200 of authoring content in a 3D environment can include receiving a user selection of a model to be applied in a 3D working area at stage 202. The 3D working area can have a predefined shape and size (e.g., a dome over a platter with a radius of 20 meters, the platter having a roof, or the platter on top of a mountain, building, etc.). The process 200 can also include retrieving a data package corresponding to the selected model at stage 204. As described above with reference to FIGS. 2A-2D, the data package can be pre-processed by an editor or other suitable entities with sufficient technical knowledge to generate the data package that can be imported into the 3D working area and suitably represent a 3D component in the 3D working area. The process 200 can further include generating or modifying one or more objects in the 3D working area based on the retrieved data packet at stage 206. The one or more objects can be generated or modified in the 3D working area without repetitive trial and error operations using multiple applications because the imported data package has been pre-processed to fit or be rendered properly in the 3D working area.

The process 200 can then include a decision stage 208 to determine whether additional models are selected. In response to determining that an additional model has been selected, the process 200 reverts to receiving the selection of the model at stage 202. Otherwise, the process 200 proceeds to generating an environmental data file containing data representing the various models of the 3D components in the 3D working area as well as an identity, position, size, relative location, or other suitable information of the objects.

FIG. 5 illustrates example operations for resizing a selected model. As shown in FIG. 5, the operations can include determining an object size of an object corresponding to the selected model, for example, expressed as height, width, and length. The values of the foregoing parameters can then be compared to corresponding dimensions of a container, for example, a cube with a predefined size.

As shown in FIG. 5, the operations can then include a decision stage 214 to determine whether resizing is needed. In one embodiment, resizing is needed when at least one value of height, width, or length exceeds a corresponding value of the container. In another embodiment, resizing is also needed when at least one value of height, width, or length is less than 90%, 95%, or other suitable percentages of a corresponding value of the container. In further embodiments, resizing can be indicated based on other suitable criteria. In response to determining that resizing is needed, the operations can include resizing the object according to, for example, a height, width, or length of the container. The operations can then include providing the resized object for position determination at stage 218. In response to determining that resizing is not needed, the operations can proceed directly to adding the selected model to the 3D working area and rendering a corresponding object in the 3D working area at stage 218.

FIG. 6 illustrates example operations for performing an undo or operation reversal when authoring content in a 3D environment. As shown in FIG. 6, the operations can include receiving a user input indicating a command for performing an undo at stage 222. The operations can then include an optional decision stage 224 to determine whether the undo command has been confirmed. In response to determining that the undo command has been confirmed, the operations proceed to removing a last model added to the 3D working area and removing a previously rendered object corresponding to the last model at stage 226.

Figure 7:
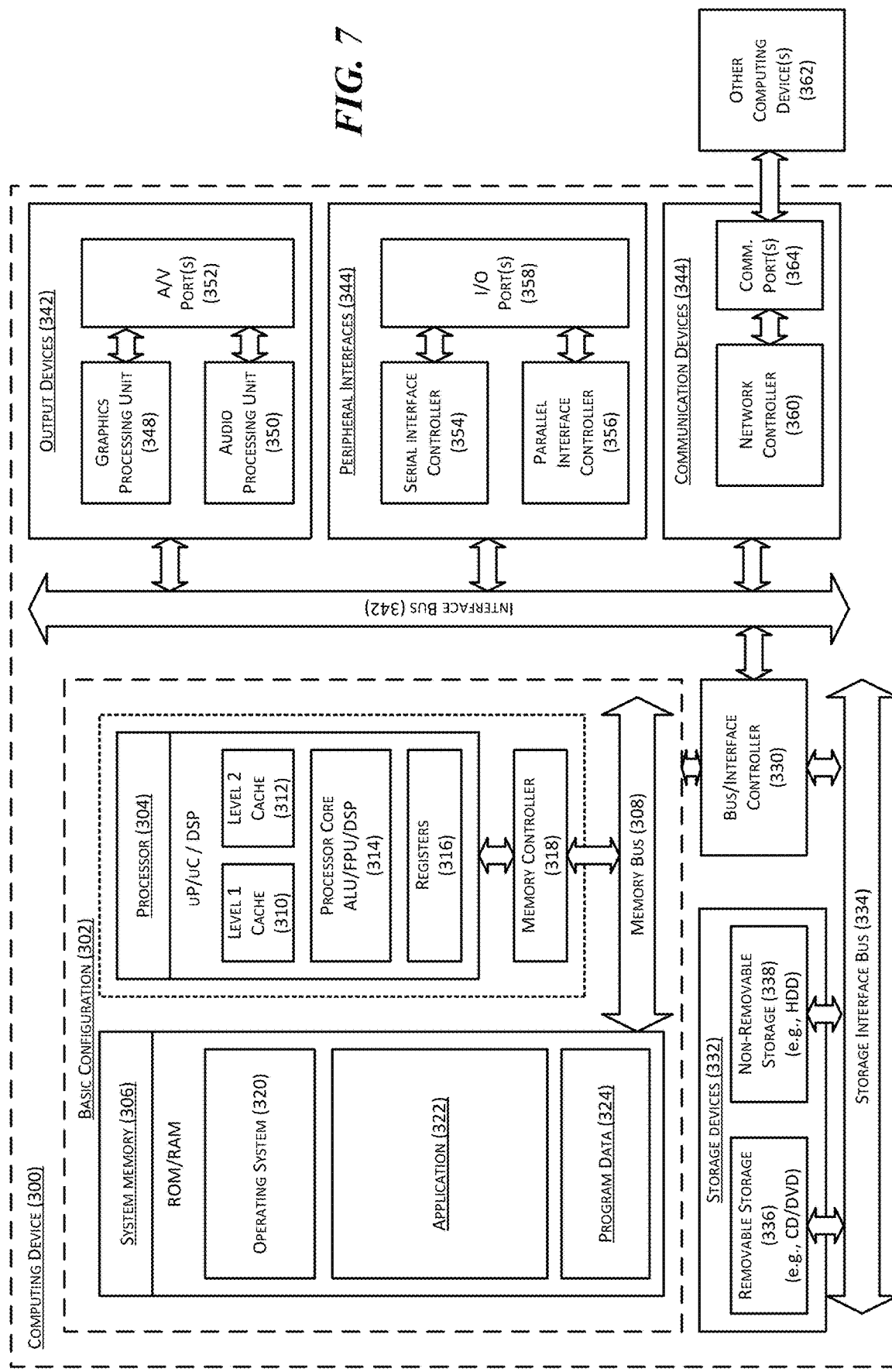
FIG. 7 is a computing device suitable for certain components of the computing framework in FIG. 1.

FIG. 7 is a computing device 300 suitable for certain components of the computing framework 100 in FIG. 1. For example, the computing device 300 can be suitable for the authoring device 102 or the viewing devices 104 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 10 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method of authoring content using a computer-based three-dimensional (3D) authoring application executed on a computing device having a display and processor, the method comprising:
   with the processor of the computing device,
      providing, on the display of the computing device, a 3D working area in a 3D environment, the 3D working area having a predefined shape and size;
      receiving a user input selecting a model corresponding to a 3D component to be applied in the 3D working area; and
      in response to receiving the user input selecting the model,
         retrieving one or more files corresponding to the model representing the 3D component, the one or more files containing data that is pre-processed according to the predefined shape and size of the 3D working area in the 3D environment; and
         based on the retrieved one or more files corresponding to the model, generating or modifying a graphical representation of the 3D component in the 3D working area, wherein the generating or modifying includes resizing the graphical representation of the 3D component represented by the model to fit into a container of a preset size such that the resized graphical representation of the 3D component is rendered in the 3D environment to be at least 90% of the same size as graphical representations of other 3D components in the 3D environment.

2. The method of claim 1 wherein the 3D working area has generally a dome shape over a platter with a radius of 20 meters in the 3D environment.

3. The method of claim 1 wherein the 3D working area has generally a dome shape over a platter with a radius of 20 meters, and wherein the 3D component belongs to one of a structure, a theme, or a background to be applied in the generally dome shape 3D working area.

4. The method of claim 1 wherein:
   receiving the user input includes receiving a user input selecting a model corresponding to a 3D component that is a color, a texture, or a lighting profile to be applied in the 3D working area; and
   generating or modifying the graphical representation includes modifying a graphical representation of a background in the 3D working area to incorporate the color, texture, or lighting profile in the background without modifying underlying data of the background outside of the 3D authoring application.

5. The method of claim 1 wherein:
   receiving the user input includes receiving a user input selecting a model corresponding to a 3D component that is a structure to be inserted into the 3D working area; and
   generating or modifying the graphical representation includes inserting the structure into the 3D working area without generating, outside of the 3D authoring application, underlying data of the structure.

6. The method of claim 1 wherein:
   the 3D working area includes a first background;
   receiving the user input includes receiving a user input selecting a model corresponding to a 3D component that is a second background to be applied in the 3D working area; and
   generating or modifying the graphical representation includes substituting the first background in the 3D working area with the second background without generating, outside of the 3D authoring application, underlying data of the second background.

7. The method of claim 1 wherein:
   the user input is a first user input; and
   the method further includes:
      receiving a second user input selecting another model corresponding to a sound to be applied in the 3D working area; and in response to receiving the second user input, inserting the sound into the 3D working area without generating, outside of the 3D authoring application, underlying data of the sound.

8. The method of claim 1, further comprising:
receiving another user input instructing undoing the generating or modifying the graphical representation; and
in response to receiving the another user input, undoing the generated or modified graphical representation of the 3D component in the 3D working area without modifying, outside of the 3D authoring application, underlying data of the 3D component.

9. The method of claim 1, further comprising:
receiving another user input instructing importation of a content item as a two-dimensional (2D) or 3D object in the 3D working area; and
in response to receiving the another user input, automatically sizing the 2D or 3D object according to the predefined shape and size of the 3D working area, wherein generating or modifying the graphical representation includes inserting the sized 2D or 3D object into the 3D working area.

10. A computing device, comprising:
a processor;
a display; and
a memory operatively coupled to the processor and the display, the memory containing instructions executable by the processor to cause the computing device to:
provide, on the display, a user interface of a 3D authoring application, the provided user interface having a 3D working area with a predefined shape and size;
receive a user input selecting a 3D component to be applied in the 3D working area of the 3D authoring application; and
in response to receiving the user input selecting the 3D component,
retrieve one or more files of the 3D component accessible by the 3D authoring application, the one or more files containing data that is pre-processed according to the predefined shape and size of the 3D working area to represent the 3D component or an effect thereof in the 3D working area; and
based on the retrieved one or more files of the 3D component,
resize a graphical representation of the 3D component to fit into a container of a preset size such that the resized graphical representation of the 3D component is rendered in the 3D environment to be at least 90% of the same size as graphical representations of other 3D components in the 3D environment; and
produce the resized graphical representation of the 3D components in the 3D working area.

11. The computing device of claim 10 wherein:
the 3D working area includes a background;
the 3D component selected is a color, a texture, or a lighting profile to be applied to the background in the 3D working area; and
to produce the graphical representation includes to modify a graphical representation of the background in the 3D working area to incorporate the color, texture, or lighting profile in the background without modifying underlying data of the background outside of the 3D authoring application.

12. The computing device of claim 10 wherein:
the 3D component selected is a structure to be inserted into the 3D working area; and
to produce the graphical representation includes to produce a 3D graphical representation of the structure into the 3D working area without generating, outside of the 3D authoring application, underlying data of the structure.

13. The computing device of claim 10 wherein:
the 3D working area includes a first background;
the 3D component selected is a second background to be applied in the 3D working area; and
to produce the graphical representation includes to substitute the first background in the 3D working area with the second background without generating, outside of the 3D authoring application, underlying data of the second background.

14. The computing device of claim 10, wherein the memory includes additional instructions executable by the processor to cause the computing device to:
receive another user input to select a sound to be applied in the 3D working area; and
produce the sound includes inserting the sound into the 3D working area without generating, outside of the 3D authoring application, underlying data of the sound.

15. The computing device of claim 10 wherein the memory contains additional instructions executable by the processor to cause the processor to:
receive another user input instructing undoing the producing the graphical representation; and
in response to receiving the another user input, undoing the produced graphical representation of the 3D component in the 3D working area without modifying, outside of the 3D authoring application, underlying data of the 3D component.

16. The computing device of claim 10 wherein the memory contains additional instructions executable by the processor to cause the processor to:
receive another user input instructing importation of a content item as a two-dimensional (2D) or 3D object in the 3D working area; and
in response to receiving the another user input, automatically size the 2D or 3D object according to the predefined shape and size of the 3D working area, wherein producing the graphical representation includes inserting the sized 2D or 3D object into the 3D working area.

17. A method of authoring content using a computer-based three-dimensional (3D) authoring application executed on a computing device having a display and processor, the method comprising:
with the processor of the computing device,
outputting, on the display of a computing device, a 3D working area and a list of 3D components applicable to the 3D working area in a 3D environment, wherein the 3D authoring application has access to data corresponding to the 3D components, the data being pre-processed according to a shape and size of the 3D working area to suitably represent the individual 3D components in the 3D environment;
receiving a user input selecting one of the outputted 3D components; and
in response to receiving the user input,
accessing the data corresponding to the selected one of the 3D components; and
based on the retrieved data,
resizing the 3D component by fitting of the 3D component into a container of a preset size such that the resized 3D component is rendered in the 3D environment to be at least 90% of the same size as other 3D components in the 3D environment; and inserting a graphical representation of the resized 3D component in the 3D working area without modifying, outside of the 3D authoring application, underlying data of the selected 3D component.

18. The method of claim 17, further comprising:

receiving another user input instructing undoing the insertion of the graphical representation; and in response to receiving the another user input, removing the inserted graphical representation from the 3D working area without modifying, outside of the 3D authoring application, underlying data of a background in the 3D working area.

19. The method of claim 17, further comprising:

receiving another user input instructing importation of a content item as a two-dimensional (2D) or 3D object in the 3D working area; and in response to receiving the another user input, automatically sizing the 2D or 3D object according to the shape and size of the 3D working area, wherein inserting the graphical representation includes inserting the sized 2D or 3D object into the 3D working area.

20. The method of claim 17 wherein:

the user input is a first user input; and the method further includes:

receiving a second user input selecting a sound to be applied in the 3D working area; and in response to receiving the second user input, inserting the sound into the 3D working area without generating, outside of the 3D authoring application, underlying data of the sound.

\* \* \* \* \*